US008870299B2

(12) United States Patent
Wieder et al.

(10) Patent No.: US 8,870,299 B2
(45) Date of Patent: Oct. 28, 2014

(54) MAIN BRAKE DEVICE OF A VEHICLE HAVING TEST RUN FOR VALVES (75) Inventors: Gerhard Wieder, Besigheim (DE); Adnan Mustapha, Maulbronn (DE); Andreas Ziegler, Weissach (DE); Frank Schwab, Kieselbronn (DE); Oliver Jundt, Hessigheim (DE); Peter Holobradi, Budaörs (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 174 days.

(21) Appl. No.: 13/510,617

(22) PCT Filed: Nov. 16, 2010

(86) PCT No.: PCT/EP2010/067558
§ 371 (c)(1),
(2), (4) Date: Aug. 8, 2012

(87) PCT Pub. No.: WO2011/061179
PCT Pub. Date: May 26, 2011

(65) Prior Publication Data
US 2012/0299369 A1    Nov. 29, 2012

(30) Foreign Application Priority Data

Nov. 18, 2009  (DE) .......................... 10 2009 053 815

(51) Int. Cl.
*B60T 8/176* (2006.01)
*B60T 17/22* (2006.01)
*B60T 8/90* (2006.01)
*B60T 17/18* (2006.01)
*B60T 8/48* (2006.01)
*B60T 8/36* (2006.01)

(52) U.S. Cl.
CPC ............ *B60T 8/4818* (2013.01); *B60T 17/221* (2013.01); *B60T 8/90* (2013.01); *B60T 17/18* (2013.01); *B60T 2270/406* (2013.01); *B60T 8/361* (2013.01)
USPC .................. 303/113.1; 303/113.2; 303/115.4; 303/121; 303/122.03; 303/122.09; 303/122.15; 188/158; 188/353; 701/71

(58) Field of Classification Search
CPC ........ B64C 25/46; B60T 8/3255; B60T 8/327
USPC .................. 303/113.1, 113.2, 122.15, 119.1; 701/70, 71; 188/158, 353
See application file for complete search history.

(56) References Cited

U.S. PATENT DOCUMENTS 3,948,568 A    4/1976  Leiber
5,409,303 A *  4/1995  Engelbert et al. .......... 303/118.1
(Continued)

FOREIGN PATENT DOCUMENTS

DE    196 39 005    3/1998
DE    101 55 952    5/2003
(Continued)

OTHER PUBLICATIONS

European Patent Office, International Preliminary Report on Patentability, May 22, 2012, from International Patent Application No. PCT/EP2010/067558, filed on Nov. 16, 2010.

(Continued)

*Primary Examiner* — Anna Momper
*Assistant Examiner* — San Aung
(74) *Attorney, Agent, or Firm* — Kenyon & Kenyon LLP (57) ABSTRACT A service brake device of a vehicle, including at least one ABS pressure control valve which is controlled for slip-regulated braking by an electronic control unit, has at least one inlet valve and one outlet valve and is arranged upstream of a pressure medium actuated brake cylinder, a pressure medium line which supplies the ABS pressure control valve with pressure medium and into which a pressure controlled by a valve device arranged upstream of the ABS pressure control valve is feedable, wherein the valve device feeds a pressure derived from a reservoir pressure of a pressure medium reservoir into the pressure medium line as a function of an activation by the electronic control unit.

12 Claims, 2 Drawing Sheets

(56) References Cited

U.S. PATENT DOCUMENTS

| | | | |
|---|---|---|---|
| 5,947,567 A * | 9/1999 | Jonner et al. | 303/115.4 |
| 6,237,401 B1 * | 5/2001 | Haehn et al. | 73/129 |
| 2003/0130781 A1 * | 7/2003 | Schramm et al. | 701/71 |
| 2004/0012252 A1 * | 1/2004 | Meyer et al. | 303/113.2 |
| 2006/0043790 A1 | 3/2006 | Spieker | |
| 2007/0046098 A1 * | 3/2007 | Grolle et al. | 303/122.15 |

FOREIGN PATENT DOCUMENTS

| | | |
|---|---|---|
| DE | 10 2006 014269 | 10/2007 |
| EP | 0 477 519 | 4/1992 |
| EP | 0 485 367 | 5/1992 |
| EP | 0 604 864 | 7/1994 |
| EP | 0 933 275 | 8/1999 |

OTHER PUBLICATIONS

European Patent Office, English Translation of International Preliminary Report on Patentability and Written Opinion, Jun. 12, 2012, from International Patent Application No. PCT/EP2010/067558, filed on Nov. 16, 2010.

International Search Report for PCT/EP2010/067558, dated Nov. 16, 2010.

* cited by examiner

MAIN BRAKE DEVICE OF A VEHICLE HAVING TEST RUN FOR VALVES

FIELD OF THE INVENTION

The present invention is based on a service brake device of a vehicle, including at least one ABS pressure control valve which is controlled for slip-regulated braking by an electronic control unit, has at least one inlet valve and one outlet valve and is arranged upstream of a pressure medium actuated brake cylinder, a pressure medium line which supplies the ABS pressure control valve with pressure medium and into which a pressure controlled by a valve device arranged upstream of the ABS pressure control valve is feedable, wherein the valve device feeds a pressure derived from a reservoir pressure of a pressure medium reservoir into the pressure medium line as a function of an activation by the electronic control unit.

BACKGROUND INFORMATION

A service brake device of a vehicle, comprising at least one ABS pressure control valve which is controlled for slip-regulated braking by an electronic control unit, has at least one inlet valve and one outlet valve and is arranged upstream of a pressure medium actuated brake cylinder is discussed, for example, in DE 101 55 952 A1.

In service brake devices of this type, there is the problem that it has hitherto not been possible reliably to check whether the ABS pressure control valves operate correctly.

In the case of a service brake device of the type in question supplemented by a valve device, which is arranged upstream of the ABS pressure control valves and is provided, for example, in order to carry out the functions of a drive slip regulation system (ASR), it would furthermore be desirable if the functions of said valve device could also be checked.

SUMMARY OF THE INVENTION

The exemplary embodiments and/or exemplary methods of the present invention is therefore based on the object of further developing a valve-containing service brake device of the type mentioned above in such a manner that malfunctions of the valves are detectable in a simple manner.

This object is achieved according to the invention by the features described herein.

According to a first aspect of the invention, at least one pressure sensor for measuring the pressure in the pressure medium line is arranged in the pressure medium line between the ABS pressure control valve and the valve device, wherein the electronic control unit is configured such that it controls the inlet valve and/or the outlet valve of the ABS pressure control valve and/or the valve device within the course of at least one test run, in order to generate a pressure detectable by the at least one pressure sensor in the pressure medium line, by evaluation of the signals supplied by the pressure sensor detects the temporal pressure profile of the pressure fed into the pressure medium line and compares said pressure profile with an expected stored pressure profile, and generates an error signal in the event of a deviation, present in accordance with predetermined criteria, of the detected pressure profile from the expected stored pressure profile.

A test run of this type may be carried out, for example, outside a regular driving mode during each start of the vehicle when the vehicle is at a standstill.

These measures make it possible in a simple manner to detect errors in the ABS pressure control valves or in the valve device which, for example, carries out the ASR functions, since only the pressure sensor and corresponding control routines in the electronic control unit are necessary as hardware for this purpose.

Since the pressure medium line in which the pressure is measured by the pressure sensor is always supplied with pressure by a certain ABS pressure control valve, detected errors can be assigned in a simple manner to the respective ABS pressure control valve.

By the measures cited in the dependent claims, advantageous developments and improvements of the invention specified in the independent claims are possible.

The electronic control unit may particularly be configured such that it directs the inlet valve and the outlet valve of the ABS pressure control valve into the blocking position, and then controls the valve device in order to feed pressure derived from the pressure medium reservoir into the pressure medium line, within the course of a first test run. The pressure medium line is accordingly pressurized by the valve device.

If the inlet valve of the ABS pressure control valve is intact, a rapid rise in the pressure profile then arises over time because only the relatively small volume of the pressure medium line is pressurized. If, by contrast, the inlet valve is defective because, for example, it does not completely close, a slower rise in the pressure profile over time is hence produced, since then the line volume of the pressure medium line connecting the ABS pressure control valve to the brake cylinder, and also a working space of the brake cylinder are additionally filled with pressure medium. Error detection is therefore possible in the inlet valve by comparison of the stored temporal pressure medium profile with the actual pressure medium profile, for example, with reference to the respective pressure gradient.

According to a development of this measure, provision may be made for the electronic control unit to be configured such that, upon directing of the inlet valve into the closed position and upon feeding of pressure into the pressure medium line by the valve device, it directs the outlet valve of the ABS pressure control valve into the open position.

Then, in the event of an inlet valve not completely closing, some of the pressure medium fed into the pressure medium line is released into the atmosphere, wherein a pressure buildup, which is measurably delayed in relation to the stored reference pressure profile and which is measurable by the pressure sensor, arises in the pressure medium line. In addition, the venting is clearly audible and therefore the venting noise relating thereto indicates a defective inlet valve of an ABS pressure control valve. The operability of an inlet valve of an ABS pressure control valve can therefore be checked with the measures described above.

An additional development of the measure described above can make provision for the electronic control unit to be configured such that it additionally directs the inlet valve of the ABS pressure control valve into the open position when the outlet valve is directed into the open position. The pressure fed into the pressure medium line via the valve device is then let into the brake cylinder through the open inlet valve, wherein an outlet valve which does not fully open cannot temporarily reduce the pressure in the brake cylinder, which indicates that there is an outlet valve error, and therefore the measured pressure profile deviates from the expected pressure profile and an error signal is generated by the electronic control unit.

If the pressure profile is monitored when the valve device and the outlet valve are jointly opened and the inlet valve is open at the same time, a more rapid pressure buildup can be determined in the event of a defective outlet valve, i.e. an outlet valve which does not fully open, than in the case of an intact outlet valve.

The operability of an outlet valve of an ABS pressure control valve can therefore also be checked by the measures described above.

The electronic control unit particularly may be configured in such a manner that it controls the valve device and that the latter feeds the pressure derived from the pressure medium reservoir into the pressure medium line for a predetermined period of time, in particular for a very short period of time, for example for 200 ms. A pressure pulse of this type can be detected by the pressure sensor, in particular in respect of the maximum pressure level and the pressure drop after the pulse in the form of characteristic variables. Deviations from the said characteristic variables then indicate valve errors.

According to a further measure, the valve device contains an ASR valve for the slip-regulated acceleration of the vehicle, which valve is firstly controllable electrically by the electronic control unit and is secondly pressure medium controllable by a control pressure output by a driver actuated service brake valve, such that, when the control pressure is output by the service brake valve, the ASR valve feeds said control pressure into the pressure medium line and, when said control pressure is activated by the electronic control unit within the scope of an ASR function, feeds the pressure derived from the pressure medium reservoir into the pressure medium line.

Provision may then be made, according to an alternative measure, for the electronic control unit to be configured such that it first of all directs the inlet valve and the outlet valve of the at least one ABS pressure control valve into a blocking position, after actuation of the service brake valve by the driver, the valve device is directed into a pass-through position until the pressure detected by the pressure sensor in that section of the pressure medium line which is arranged between the valve device and the ABS pressure control valve is constant, and then the outlet valve of the at least one ABS pressure control valve switches into the open position, within the course of a second test run. As a result, the brake cylinder is relieved of pressure. If the inlet valve has a defect, pressure medium flows from the pressure medium line into the brake cylinder, as a result of which a pressure drop which is not expected in the pressure medium line is detectable by the pressure sensor.

As an alternative, the valve device may contain a pressure regulating module, for example a 1-support pressure regulating module for generating a regulated brake pressure in the at least one brake cylinder, wherein this has the advantage that the pressure sensor is already integrated in the pressure regulating module.

The pressure medium particularly may be formed by compressed air and the service brake device is assigned to a utility vehicle. However, the invention is not restricted to pneumatic service brake devices and may on the contrary be used for any type of pressure medium actuated service brake devices in which ABS pressure control valves are installed.

The above described embodiments of the invention require the presence of a pressure sensor in the pressure medium line running between the valve device and the ABS pressure control valve.

If a pressure sensor of this type is intended to be omitted, the wheel rotational speed sensors, which are customary in ABS/ASR systems, for measuring the wheel rotational speeds and/or an acceleration sensor for measuring the longitudinal acceleration of the vehicle can be used in order to supply relevant measured values from which conclusions can be drawn regarding the operability of the valves of service brake devices.

According to a further aspect of the invention, it is therefore proposed that the electronic control unit is configured such that it controls the inlet valve and/or the outlet valve of the ABS pressure control valve and/or the valve device within the course of at least one test run, in order to generate a pressure in the pressure medium line, and in that the value of the wheel slip which is then present is detected by the wheel rotational speed sensor and/or the value of the vehicle acceleration or deceleration which is then present is detected by the acceleration sensor and compared with stored values, and an error signal is generated in the event of a deviation, which is present in accordance with predetermined criteria, of the detected values from expected values.

The electronic control unit may then particularly be configured such that it directs the inlet valve and the outlet valve of the ABS pressure control valve into the blocking position and then controls the valve device in order to feed pressure derived from the pressure medium reservoir into the pressure medium line within the course of a test run at what may be a constant and low speed of the vehicle. If the inlet valve of the ABS pressure control valve is intact, i.e. closes correctly, only the pressure medium line between the valve device and the ABS pressure control valve is filled, whereas pressure is not fed from the pressure medium line into the brake cylinder. If the brake cylinder remains in the release position, a wheel slip also cannot be determined by the wheel rotational speed sensor and also deceleration cannot be determined by the acceleration sensor. The measured values and the comparison values, which are stored in the control unit, for the acceleration and the wheel slip are therefore equal to zero.

By contrast, if the inlet valve is defective, i.e. does not close correctly, pressure from the pressure medium line is fed into the brake cylinder, which causes a certain braking action and therefore a certain deceleration of the vehicle and a certain brake slip. Said values which are then detected by the acceleration sensor and by the wheel rotational speed sensor in conjunction with the electronic control unit are then compared with the expected reference values, which have the value equal to zero, in the memory of the electronic control unit. The deviation, which is present here, of the measured values from the stored values then indicates a defective inlet valve, whereupon a corresponding error signal is generated by the electronic control unit.

The operability of an inlet valve of an ABS pressure control valve can therefore be checked with the measures described above.

According to one development, the electronic control unit can be configured such that it directs the inlet valve and the outlet valve of the ABS pressure control valve into the open position in the event of a pressure which is derived from the pressure medium reservoir and is present in the pressure medium line. If the outlet valve is intact, i.e. fully opens, pressure medium is let out of the pressure medium line via the outlet valve. Only a small braking action and therefore a small brake slip is therefore measurable by the wheel rotational speed sensor and by the acceleration sensor. A comparison with stored reference values would therefore not reveal any significant deviations. If, by contrast, the outlet valve of the ABS pressure control valve is defective, for example, because it does not fully or correctly open, a higher pressure is directed through to the brake cylinder, which results in a greater than expected braking action. This can be detected by the relevant wheel rotational speed sensor or the acceleration sensor and an error signal can be generated.

The error signal may be indicated optically, for example by a warning light in the driver's cab of the vehicle, and/or acoustically. However, entry into a readable error memory of the electronic control unit is also conceivable.

More precise details are apparent from the description below of exemplary embodiments.

Exemplary embodiments of the invention are illustrated below in the drawing and are explained in more detail in the description which follows.

DETAILED DESCRIPTION

Figure 1:
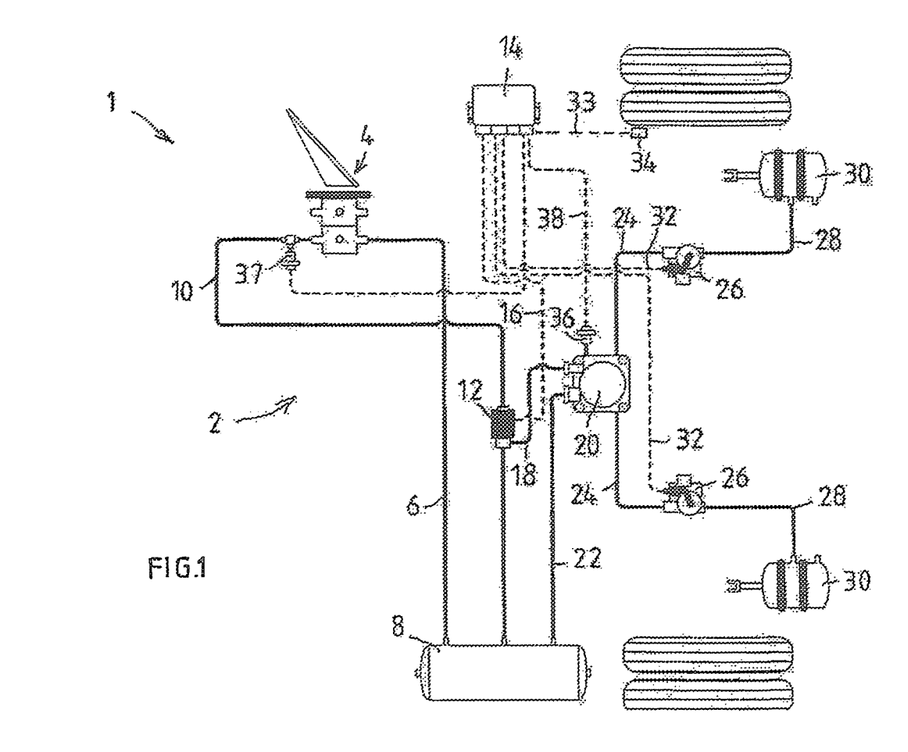
FIG. 1 shows a schematic assembly plan of a service brake device of a utility vehicle according to an exemplary embodiment of the invention.

FIG. 1 illustrates an embodiment of an electro-pneumatic service brake device 1 of a utility vehicle. The service brake device 1 has two brake circuits, one brake circuit for the front axle and one brake circuit for the driven rear axle, wherein, for the sake of clarity, only the brake circuit 2 for the rear axle is described here. The service brake device 1 has a brake slip regulated antilock system (ABS) and may also have a drive slip regulation system (ASR).

Starting from a service brake valve 4 which is actuated by the driver's foot and the pneumatic rear axle brake circuit 2 of which is supplied with compressed air from a rear axle reservoir 8 by a reservoir line 6, a control pressure line 10 extends as far as a control input of an ASR valve 12 which may be formed by a 3/2-way directional control valve which is firstly controlled by the control pressure, which is output by the service brake valve 4, in the control pressure line 10 and secondly by electric signals conducted in an electric control line 16 linked thereto from an electronic control unit 14. At the working output thereof, the ASR valve 12 is connected by a pressure medium line 18 to a control input of a relay valve 20, the reservoir connection of which is likewise connected to the rear axle reservoir 8 by a reservoir line 22. The two working outputs of the relay valve 20 are each connected to a pressure medium line 24 which leads into one ABS pressure control valve 26 each.

ABS pressure control valves 26 of this type are sufficiently well known, for example from EP 0 304 610 B1. They each contain an inlet valve and an outlet valve. The ABS pressure control valves 26 are each connected to a compressed air actuated active service brake cylinder 30 via pneumatic connecting lines 28.

By the ABS pressure control valves 26, slip-regulated braking actions are realized within the scope of the ABS by said braking actions being activated in order to maintain pressure, increase pressure or reduce pressure by the electronic control unit 14 by signal lines 32 as a function of the wheel rotational speed, which is in each case present and is measured by one wheel rotational speed sensor 34 in each case, and the brake slip calculated from said wheel rotational speed. For this purpose, the wheel rotational speed sensors are connected to the electronic control unit 14 by signal lines 33.

For the sake of clarity, the elements described above are illustrated merely for the rear axle side in FIG. 1. The principle of this configuration may also be applied to the front axle. Accordingly, the valve 12 does not have to be an ASR valve. On the contrary, the valve 12 may constitute any switching valve, in particular also for the front axle, within the scope of ESP, ACC (adaptive cruise control), etc.

In order to reduce pressure in the respective service brake cylinder 30, the outlet valve of the associated ABS pressure control valve 26 is, for example, opened when the inlet valve is closed, in order to increase the pressure the inlet valve is opened and the outlet valve is closed, and, in order to maintain the pressure, the pressure in the service brake cylinder 30 is maintained by the closed inlet valve and the closed outlet valve. In this case, "closed" means that the respective valve is switched into the blocking position, whereas "opened" means that the valve in question is switched into the passage position. The electronic control unit 14 therefore carries out an appropriate activation depending in each case on whether the inlet and outlet valves are intended to be opened or closed currentlessly or in an energized manner.

The ASR valve 12, if it is charged with control pressure air via the pneumatic control line 10 by actuation of the service brake valve 4 at the pneumatic control input thereof, switches said control pressure to the pneumatic control input of the relay valve 20, whereupon the latter modulates a brake pressure from the reservoir pressure of the rear axle reservoir 8. Said brake pressure is then fed into the respective pressure medium line 24 arranged between the relay valve 20 and the ABS pressure control valve 26. The pressure prevailing in said pressure medium line 24 is measured by a pressure sensor 36 and reported to the electronic control unit 14 by a signal line 38. For clarity reasons, only one pressure sensor 36 is arranged in FIG. 1 in the pressure medium line 24 assigned to the right rear wheel. Of course, a pressure sensor of this type may also be arranged in the pressure medium line assigned to the left rear wheel.

If no brake slip regulation is required, the brake pressure is fed unchanged into the service brake cylinder 30 of the rear axle. Upon occurrence of an impermissible brake slip, which can be detected by the respective wheel rotational speed sensor 34, the pressure in the service brake cylinder 30 is briefly reduced by opening of the outlet valve of the associated ABS pressure control valve 26 and is subsequently increased again or maintained.

In the event of an impermissible driving slip, which can likewise be determined by the wheel rotational speeds reported to the electronic control unit 14 via the electric signal lines 33, the ASR valve 12 is automatically activated by the electronic control unit 14 via the electric control line 16 without action by the driver. The ASR valve 12 then switches a pressure derived from the reservoir pressure of the rear axle reservoir 8 to the pneumatic control input of the relay valve 20 which then feeds a brake pressure derived from said pressure into the pressure medium lines 24 between the relay valve 20 and the ABS pressure control valve 26 in order to brake the drive-slipping wheels to a permissible driving slip.

The relay valve 20 is not necessarily present, and therefore the pressure medium line 24 having the pressure sensor 36 may also extend directly between the ASR valve 12 and the ABS pressure control valve.

The electronic control unit 14, which may be a combined ABS/ASR brake control unit is configured such that it controls the inlet valve and/or the outlet valve of the ABS pressure control valves 26, and/or the ASR valve 12 within the course of at least one test run in order to generate a pressure, detectable by the pressure sensor 36, in the pressure medium line 24 assigned here to the right rear wheel.

A test run of this type may be carried out at regular or irregular time intervals, for example during or after each vehicle start or while the vehicle is at a standstill.

By evaluation of the signals, which are supplied by the pressure sensor 36, by the electronic control unit 14, the temporal pressure profile of the pressure fed into the pressure medium line 24 is then detected and compared with an expected pressure profile stored in a memory of the electronic control unit 14. In the event of a deviation, which is present in accordance with predetermined criteria, of the detected pressure profile from the expected stored pressure profile, an error signal is then generated, the error signal indicating a defect or error in one or more valves.

The electronic control unit 14 particularly may be configured such that it directs the inlet valve and the outlet valve of the ABS pressure control valve 26 into the blocking position and then controls the ASR valve 12 in order to feed the pressure derived from the rear axle reservoir 8 into the pressure medium line 24, within the course of a first test run. The pressure medium line 24 is accordingly pressurized by the ASR valve 12, wherein the volume of the pressure medium line 24 is sealed off from the service brake cylinder 30 by the closed inlet and outlet valves of the ABS pressure control valve 26.

If the inlet valve of the ABS pressure control valve 26 is intact, a rapid rise of the pressure profile over time then arises because only the relatively small volume of the pressure medium line 24 is pressurized. Said pressure profile is recorded by the pressure sensor 36 in the pressure medium line 24.

If, by contrast, the inlet valve is defective because, for example, it does not fully close, a slower rise in the pressure profile over time arises, since then the line volume of the connecting line connecting the ABS pressure control valve 26 to the service brake cylinder 30 and also a working chamber of the service brake cylinder are then additionally filled with pressure medium. By a comparison of a stored temporal reference pressure medium profile with the actual measured pressure medium profile, for example with reference to the respective pressure gradient, an error detection is therefore possible in the inlet valve or in the outlet valve of the ABS pressure control valve 26 or in the ASR valve 12.

Figure 2:
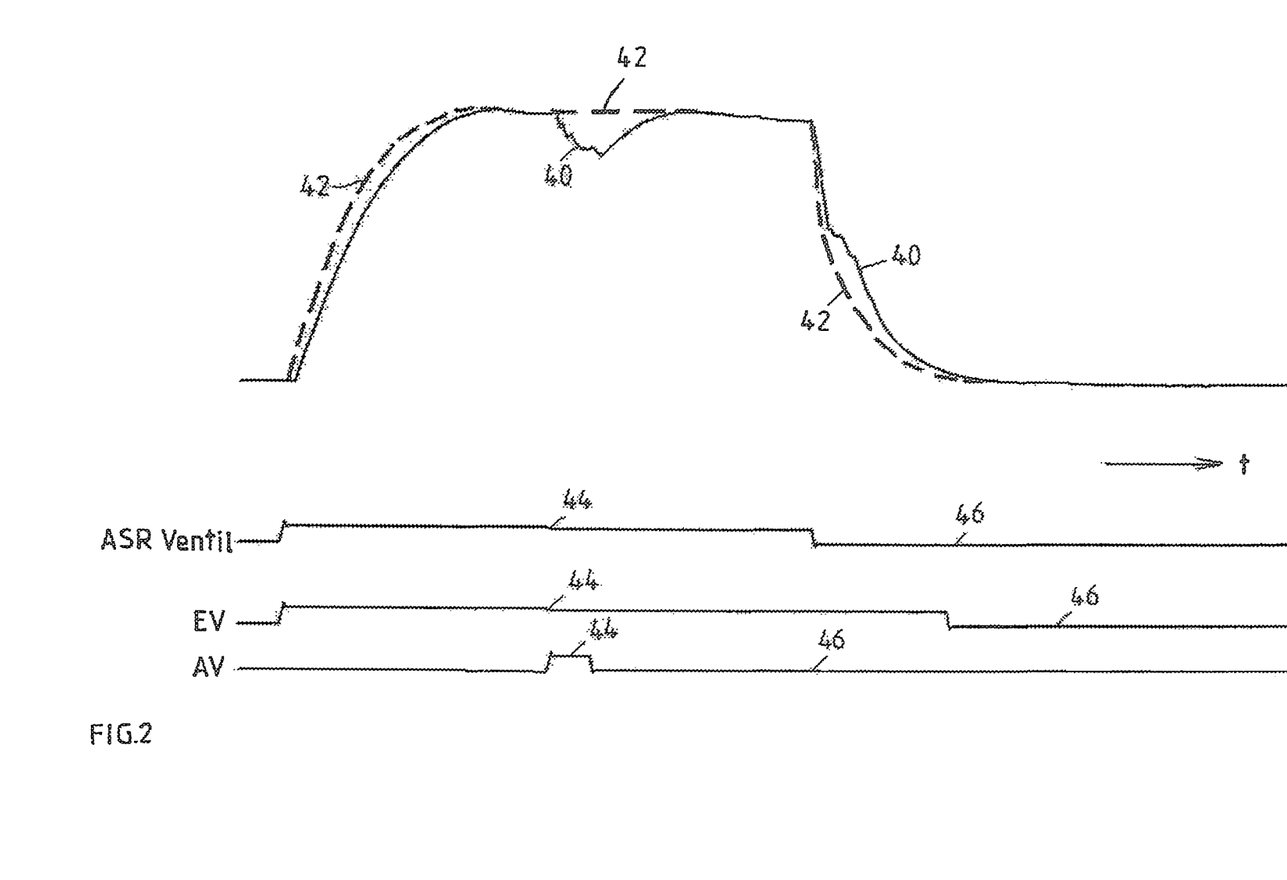
FIG. 2 shows a measured pressure profile and a reference pressure profile over time.

In FIG. 2, a measured pressure profile (solid line) 40 is compared with a stored temporal reference pressure profile (dashed line) 42 over time t. Energizing 44 of the valve in question (ASR valve 12, inlet valve EV, outlet valve AV) by the control unit 14 is indicated therebelow graphically by an elevation and discharge 46 of the valve in question by a depression 46.

In this case, the ASR valve 12 is first of all activated by energizing 44 in order to feed a pressure, which is derived from the rear axle reservoir 8, into the pressure medium line 24 via the relay valve 20. At the same time, the inlet valve of the ABS pressure control valve 26 is energized in order to switch the latter into the blocking position. When the inlet valve is closed correctly, a constant pressure would then have to build up in the pressure medium line 24 after some time, as the reference pressure profile 42 shows. If the outlet valve is then additionally energized, in order to be briefly opened, the pressure (which is then shut off) remains constant. If, by contrast, the inlet valve is defective because it, for example, does not completely close, a pressure drop (see bend in the pressure profile 40 in FIG. 2) arises in the pressure medium line 24 as long as the outlet valve is activated.

According to a further embodiment of the method, the electronic control unit 14 can be configured such that, when the inlet valve is directed into the closed position and when pressure is fed into the pressure medium line 24 through the ASR valve 12, said electronic control unit 14 directs the outlet valve of the ABS pressure control valve 26 into the open position. Then, in the event of an inlet valve not being completely closed, some of the pressure medium fed into the pressure medium line 24 is let out into the atmosphere, wherein a pressure buildup, which is measurably delayed in relation to a stored reference pressure profile, arises in the pressure medium line 24 and is measurable by the pressure sensor 36. In addition, the venting through the outlet valve is clearly audible, and therefore the venting noise relating thereto indicates a defective inlet valve of an ABS pressure control valve 26.

Furthermore, the electronic control unit 14 can be configured such that, when the outlet valve is directed into the open position, the inlet valve of the ABS pressure control valve 26 is additionally directed into the open position. The pressure fed into the pressure medium line 24 via the ASR valve 12 and the relay valve 20 is then let into the service brake cylinder 30 through the open inlet valve of the ABS pressure control valve 26. In the process, an outlet valve which is defective because it does not completely open cannot temporarily reduce the pressure in the service brake cylinder 30, which indicates an error in the outlet valve.

If the pressure profile is monitored upon joint activation of the ASR valve 12 and opening of the outlet valve and with the inlet valve open at the same time, a more rapid pressure build up can be determined in the case of an outlet valve of the ABS pressure control valve 26 that is defective, i.e. does not completely open, than in the case of an intact outlet valve.

The electronic control unit 14 particularly may be configured such that it controls the ASR valve 12, and such that the latter feeds a pressure derived from the rear axle reservoir 8 via the relay valve 12 into the pressure medium line 24 for a predetermined period of time, in particular for a very short period of time, for example for 200 ms. A pressure pulse of this type can be detected in the pressure medium line 24 by the pressure sensor 36, in particular in the form of characteristic variables in respect of the maximum pressure level and the pressure drop after the pulse. Deviations from said characteristic variables then indicate valve errors.

Not least, the electronic control unit 14 may be configured such that it first of all directs the inlet valve and the outlet valve of the ABS pressure control valve 26 into the blocking position and, after an actuation of the service brake valve 4 by the driver, the ASR valve 12 is directed into a pass-through position until the pressure detected by the pressure sensor 36 in the pressure medium line 24 arranged between the relay valve 20 and the ABS pressure control valve 26 is constant, within the course of a second test run. The outlet valve of the ABS pressure control valve 26 is then switched into the open position, as a result of which the service brake cylinder 30 is relieved of pressure. If the inlet valve of the ABS pressure control valve 26 has a defect, pressure medium then flows out of the pressure medium line 24 into the service brake cylinder, as a result of which a pressure drop in the pressure medium line 24 is detectable by the pressure sensor 36.

Instead of an ASR valve 12, a pressure regulating module may also be provided, for example a one-port pressure regulating module, in order to generate a regulated brake pressure in the at least one service brake cylinder 30, wherein, in this case, the pressure sensor 36 which measures the pressure in the pressure medium line 24 extending between the pressure regulating module and the ABS pressure control valve 26 is already integrated in the pressure regulating module. Furthermore, the relay valve 20 is also already integrated in the pressure regulating module which then also carries out the ASR functions.

Not least, instead of an ASR valve 12, a proportional valve may also be installed as long as the latter can be activated by an electronic control unit 14 in order to feed compressed air into the pressure medium line 24 or to prevent feeding in of this type.

The above described embodiments of the invention require the presence of a pressure sensor 36 in the pressure medium line 24 running between the ASR valve 12 and the ABS control pressure valve 26. A pressure sensor 36 of this type may be omitted if, as is customary in ABS/ASR systems, there are wheel rotational speed sensors 34 for measuring the wheel rotational speeds and/or there is at least one acceleration sensor for measuring the longitudinal acceleration of the vehicle.

The electronic control unit 14 can then be configured such that it controls the inlet valve and/or the outlet valve of the ABS pressure control valve 26 and/or the ASR valve 12, in order to generate a pressure in the pressure medium line 24, within the course of at least one test run, and that the value of the wheel slip which is then present is detected by the relevant wheel rotational speed sensor 34 and/or the value of the vehicle acceleration or deceleration which is then present is detected by the acceleration sensor and compared with stored values, and, in the event of a deviation, which is present in accordance with predetermined criteria, of the detected values from expected values, an error signal is generated.

The electronic control unit 14 then particularly may be configured such that it directs the inlet valve and the outlet valve of the ABS pressure control valve 26 into the blocking position and then controls the ASR valve 12 in order to feed the pressure derived from the rear axle reservoir 8 into the pressure medium line 24, within the course of a test run at what may be a constant and low speed of the vehicle. In the event of an intact, i.e. correctly closing, inlet valve of the ABS pressure control valve 26, the pressure medium line 24 between the relay valve 20 and the ABS pressure control valve 26 is pressurized, whereas no pressure is fed into the service brake cylinder 30 from the pressure medium line 24. The service brake cylinder 30 therefore remains in the release position, and therefore a wheel slip can also not be determined by the wheel rotational speed sensor 34 and a deceleration cannot be determined by the acceleration sensor either. The measured values and the comparison values, which are stored in the control unit 14, for the acceleration and the wheel slip are therefore equal to zero.

By contrast, in the event of an inlet valve which is defective, i.e. does not close correctly, pressure is unintentionally fed from the pressure medium line 24 into the service brake cylinder 30, which causes a certain braking action and therefore a certain vehicle deceleration and a certain braking slip. Said values which are then detected by the acceleration sensor or by the wheel rotational speed sensor 34 in conjunction with the electronic control unit 14 are then compared with the expected reference values, which have the value equal to zero, in the memory of the electronic control unit 14. The deviation which is present here in the measured values from the stored values then indicates a defective inlet valve, whereupon a corresponding error signal is generated by the electronic control unit 14.

The operability of an inlet valve of an ABS pressure control valve 26 can therefore be checked with the measures described above.

According to one development, the electronic control unit 14 can be configured such that it directs the inlet valve and the outlet valve of the ABS pressure control valve 26 into the open position in the event of a pressure which is derived from the rear axle reservoir 8 and is present in the pressure medium line 24. In the event of an outlet valve which is intact, i.e. completely open, pressure medium is let out of the pressure medium line 24 via the outlet valve. Only a small braking action and therefore a small slip are therefore measurable by the wheel rotational speed sensor 34 and by the acceleration sensor. A comparison with stored reference values would therefore not reveal any significant deviations. If, by contrast, the outlet valve of the ABS pressure control valve 26 is defective, for example, because it does not fully or correctly open, a higher pressure is directed through to the service brake cylinder 30, which results in a greater than expected braking action. This can be detected by the relevant wheel rotational speed sensor 34 or the acceleration sensor and an error signal can be generated.

The error signal may be indicated optically, for example by a warning light in the driver's cab of the vehicle, and/or acoustically. However, entry in a readable error memory of the electronic control unit is also conceivable.

Furthermore, the function of the pressure sensor 36 itself can also be checked, in particular whether the latter operates correctly within the entire pressure measurement range. This is because, in most service brake situations, the service brake is merely subjected to a fraction of the maximum possible brake pressure (full braking action), and therefore a pressure sensor arranged, for example, directly on the brake cylinder 30 then generally only measures pressures during operation up to said fraction and the operation of said pressure sensor for higher pressures is only rarely used and can be tested. If, by contrast, the pressure sensor 36 is arranged in the flow path between the ASR valve 12 and the ABS valves 26, as shown in FIG. 1, the full pressure spectrum from a minimum braking pressure as far as a maximum braking pressure can be passed through within the course of the test run and therefore the function of the pressure sensor 36 can therefore also be checked in respect of the entire measurement range.

For this purpose, use may be made of a comparison (synchronism) of the pressure measured by the pressure sensor 36 with the control pressure which is measured by a pressure sensor 37 which is arranged in the control pressure line 10 stretched from the service brake valve 4 to the valve 12.

Not least, the function of the valve 12 may also be checked with the aid of the pressure sensors 36, 37. This is because said valve 12 may be left defective, for example, in the pass-through position thereof although it has been directed into the blocking position, because neither has the driver actuated the service brake valve 4 nor has an electric activation of the valve 12 taken place. In this case, the pressure sensor 37 shows a low pressure, whereas the pressure sensor 37 shows a high pressure because of the valve 12 remaining in the pass-through position.

LIST OF REFERENCE NUMBERS

1 Service brake device
2 Brake circuit
4 Service brake valve
6 Reservoir line
8 Rear axle reservoir
10 Pressure control line
12 ASR valve
14 Control unit
16 Control line
18 Pressure medium line
20 Relay valve
22 Reservoir line
24 Pressure medium line
26 ABS pressure control valve
28 Connecting line
30 Service brake cylinder 32 Signal line
33 Signal line
34 Wheel rotational speed sensor
36 Pressure sensor
37 Pressure sensor
38 Signal line
40 Measured pressure profile
42 Reference pressure profile
44 Energizing
46 Discharging

The invention claimed is:

1. A service brake device for a vehicle, comprising:
at least one ABS pressure control valve, which is controlled for slip-regulated braking by an electronic control unit, has at least one inlet valve and one outlet valve and is arranged upstream of a pressure medium actuated brake cylinder; and
a pressure medium line which supplies the ABS pressure control valve with a pressure medium and into which a pressure controlled by a valve device arranged upstream of the ABS pressure control valve is feedable, wherein the valve device feeds a pressure derived from a reservoir pressure of a pressure medium reservoir into the pressure medium line as a function of an activation by the electronic control unit;
wherein at least one pressure sensor for measuring the pressure in the pressure medium line is arranged in the pressure medium line,
wherein the electronic control unit is configured such that it controls the inlet valve and/or the outlet valve of the ABS pressure control valve and/or the valve device within the course of at least one test run, in order to generate a pressure detectable by the at least one pressure sensor in the pressure medium line, wherein the pressure sensor is coupled to the valve device and the pressure medium line couples the valve device and the ABS pressure control valve,
wherein evaluation of the signals supplied by the pressure sensor is used to detect the temporal pressure profile of the pressure fed into the pressure medium line and compares said pressure profile with an expected stored pressure profile,
wherein an error signal is generated in the event of a deviation, present in accordance with predetermined criteria, of the detected pressure profile from the expected stored pressure profile,
wherein the electronic control device is configured so that it: (a) directs the inlet valve and the outlet valve of the ABS pressure control valve into the blocking position, and then (b) controls the valve device to feed pressure derived from the pressure medium reservoir into the pressure medium line, within the course of a first test run, and
wherein the electronic control unit is configured such that, within (b), it additionally directs at least one of the inlet valve and the outlet valve of the ABS pressure control valve into the open position.

2. The service brake device of claim 1, wherein the electronic control unit configured such that, within (b), it additionally directs the outlet valve of the ABS pressure control valve into the open position.

3. The service brake device of claim 1, wherein the electronic control unit is configured such that, within (b), it additionally directs the inlet valve of the ABS pressure control valve into the open position.

4. The service brake device of claim 1, wherein the electronic control unit is configured such that, within (b), it additionally directs the inlet valve and the outlet valve of the ABS pressure control valve into the open position.

5. The service brake device of claim 1, wherein the electronic control unit is configured such that it controls the valve device, and that the latter feeds the pressure derived from the pressure medium reservoir into the pressure medium line in the form of a pressure pulse for a predetermined period of time.

6. The service brake device of claim 1, wherein the valve device contains an ASR valve for the slip-regulated acceleration of the vehicle, which valve is firstly controllable electrically by the electronic control unit and is secondly pressure medium controllable by a control pressure output by a driver actuated service brake valve, such that, when the control pressure is output by the service brake valve, the ASR valve feeds said control pressure into the pressure medium line and, when said control pressure is activated by the electronic control unit within the scope of an ASR function, feeds the pressure derived from the pressure medium reservoir into the pressure medium line.

7. The service brake device of claim 5, wherein the electronic control unit is configured such that it: (i) first of all directs the inlet valve and the outlet valve of the at least one ABS pressure control valve into the blocking position, (ii) after actuation of the service brake valve by the driver, the valve device is directed into a pass-through position until the pressure detected by the pressure sensor in the pressure medium line is constant, and then (iii) the outlet valve of the at least one ABS pressure control valve is switched into the open position, within the course of a second test run.

8. The service brake device of claim 1, wherein the valve device contains a pressure regulating module for generating a regulated brake pressure in the at least one brake cylinder, and in that the pressure sensor is integrated in the pressure regulating module.

9. A service brake device for a vehicle, comprising:
at least one ABS pressure control valve, which is controlled for slip-regulated braking by an electronic control unit, has at least one inlet valve and one outlet valve and is arranged upstream of a pressure medium actuated brake cylinder;
a pressure medium line which supplies the ABS pressure control valve with pressure medium and into which a pressure controlled by a valve device arranged upstream of the ABS pressure control valve is feedable; and
at least one wheel rotational speed sensor and/or at least one acceleration sensor for measuring the longitudinal acceleration of the vehicle;
wherein the valve device feeds a pressure derived from a reservoir pressure of a pressure medium reservoir into the pressure medium line as a function of an activation by the electronic control unit, and
wherein the electronic control unit is configured such that: (i) it controls the inlet valve and/or the outlet valve of the ABS pressure control valve and/or the valve device within the course of at least one test run, in order to generate a pressure in the pressure medium line, and (ii) in that the value of the wheel slip which is then present is detected by the wheel rotational speed sensor and/or the value of the vehicle acceleration or deceleration which is then present is detected by the acceleration sensor and compared with stored values, and (iii) an error signal is generated in the event of a deviation, which is present in accordance with predetermined criteria, of the detected values from expected values, wherein the pressure sensor is coupled to the valve device and the pressure medium line couples the valve device and the ABS pressure control valve, wherein the electronic control device is configured so that it: (a) directs the inlet valve and the outlet valve of the ABS pressure control valve into the blocking position, and then (b) controls the valve device to feed pressure derived from the pressure medium reservoir into the pressure medium line, within the course of a test run, and wherein the electronic control unit is configured such that, within (b), it additionally directs at least one of the inlet valve and the outlet valve of the ABS pressure control valve into the open position.

10. The service brake device of claim 9, wherein the electronic control unit is configured such that, within (b), it directs the inlet valve and the outlet valve of the ABS pressure control valve into the open position.

11. The service brake device of claim 9, wherein the electronic control unit configured such that, within (b), it additionally directs the outlet valve of the ABS pressure control valve into the open position.

12. The service brake device of claim 9, wherein the electronic control unit is configured such that, within (b), it additionally directs the inlet valve of the ABS pressure control valve into the open position.

* * * * *